(No Model.)

W. ROBINSON.
ELECTRIC MOTOR CAR.

No. 537,857. Patented Apr. 23, 1895.

WITNESSES:
Geo. H. Cashman.
Harry B. Williams.

INVENTOR:
William Robinson

UNITED STATES PATENT OFFICE.

WILLIAM ROBINSON, OF BOSTON, MASSACHUSETTS.

ELECTRIC-MOTOR CAR.

SPECIFICATION forming part of Letters Patent No. 537,857, dated April 23, 1895.

Original application filed April 12, 1889, Serial No. 307,041. Divided and this application filed January 16, 1890. Serial No. 337,158. (No model.)

*To all whom it may concern:*

Be it known that I, WILLIAM ROBINSON, a citizen of the United States, residing at Boston, in the county of Suffolk and State of Massachusetts, have invented a new and useful Improvement in Electric-Motor Cars, of which the following is a specification.

This case is Division B of my application for a patent for an improvement in electric motor cars, filed April 12, 1889, Serial No. 307,041.

My invention relates to the method of applying the motors to the car or truck.

The nature of my invention will be clearly understood from the description which follows, reference being had to the accompanying drawings, which form a part of this specification, in which—

Figure 1:
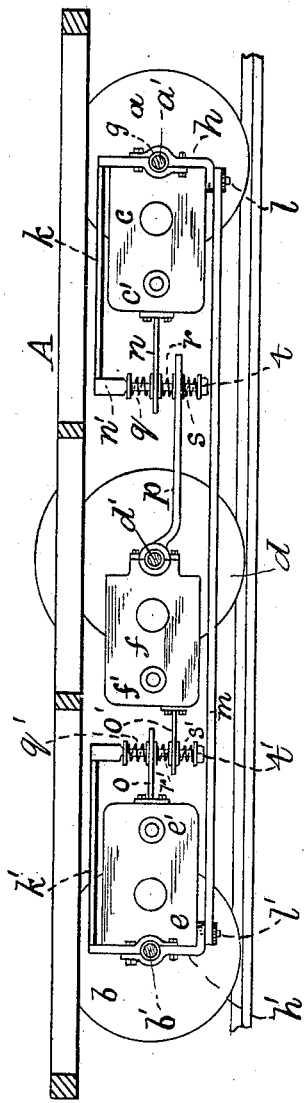
Figure 3:
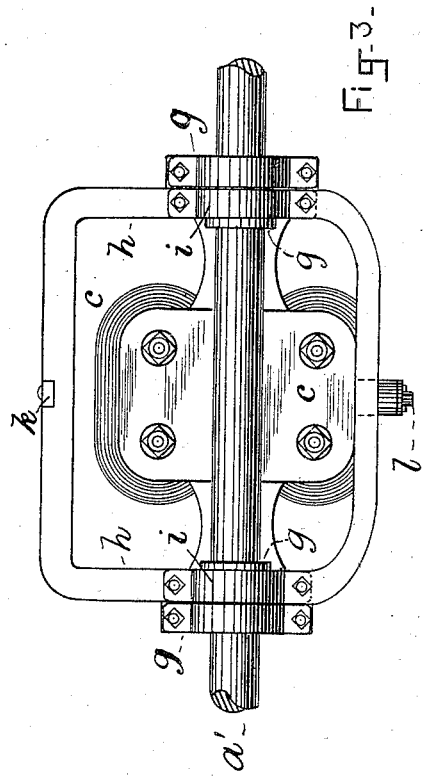
Figure 2:
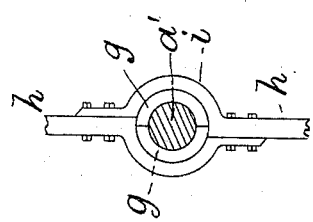

Figure 1 is a side elevation, partly in section, of an electric car or truck, with the face wheels removed, illustrating my invention. Fig. 2 is an enlarged section of the axle $a'$, showing the relation thereto of the motor-supporting connections, and Fig. 3 is an end elevation illustrating part of the mechanism for suspending the motor flexibly from the axles.

Similar letters of reference indicate corresponding parts in all the figures.

A is a car or truck frame provided with the end wheels $a$ and $b$ and their respective axles $a'$ $b'$, and with the intermediate wheels $d$ and axle $d'$.

The axles $a'$, $b'$, $d'$, are provided respectively, with the motors $c$, $e$, $f$. Each of said motors has one end supported by its axle, as shown in Fig. 1, in which the motor $c$ for instance, is shown as having one end supported on the axle $a'$ by the sleeves $g$ (see also Figs. 2 and 3), in any usual or suitable manner.

The opposite ends of the motors are supported flexibly in a peculiar manner, as follows: The bar or frame $h$, formed of one or more pieces, is secured adjustably on the motor sleeves $g$, as shown at $i$, whereby the motor and said bar are adjustable, somewhat, relatively to each other, in a vertical plane.

Rigidly secured to the bar $h$, or forming a part thereof, is the horizontal bar $k$, extending, preferably, to a point nearly midway between the adjacent axles.

The lower end of the bar or frame $h$ terminates in the swiveling or bearing point $l$, below, or in a vertical line near to, the axle $a'$.

The axle $b'$ is provided with a similar bar $h'$, horizontal bar $k'$ and swiveling or bearing point $l'$. The bars $h$, $h'$ are connected and held in position by the horizontal bar $m$, as shown.

From the free or inner end of the bar $k$ is suspended, by the bracket $n$, the free end $c'$ of the motor $c$, as shown at $n'$, and from the free or inner end of the corresponding bar $k'$ are suspended, by the brackets $o$, $o'$, the free ends $e'$ $f'$ of the motors $e$, $f$, as shown. The bracket $p$ is rigidly secured to the back end of the intermediate motor $f$ and has its free end supported by the end of the bar $k$.

The springs $q$, $r$, $s$, are placed around the supporting rod $t$, which is supported at $n'$ from the bar $k$, whereby the motors $c$, $f$, are flexibly supported from said bar $k$ by said springs, as shown. In a similar manner the ends $e'$ $f'$ of the motors $e$, $f$, are supported flexibly by the springs $q'$ $r'$ $s'$, said springs, in turn, being supported by the bar $k'$.

It will be observed that the motor sleeves $g$ are adapted to turn adjustably within that part of the bar $h$ surrounding said sleeves. Consequently the free end $c'$ of the motor $c$ is free to move up and down adjustably relatively to the supporting bar $k$. This bar $k$ would operate as well if sleeved directly to the axle, but this would involve the additional and unnecessary friction and expense of additional journal boxes. I therefore prefer to support said bar $h$ on the motor sleeves $g$ as described.

The bar $m$, engaging the lower ends of the bars $h$ $h'$, keeps the bars $k$ $k'$ in a horizontal position, notwithstanding the fact that a large proportion of the weight of the motors is supported by said last named bars. The adjacent motors $c$, $f$, however, practically support and balance each other flexibly, through their respective brackets $n$, $p$, and the springs $q$, $r$, $s$, as shown. Furthermore, the intermediate motor $f$ becomes, to a large extent, an equalizer between the other two motors.

When the intermediate motor $f$ is omitted, then the bracket $p$, supported by the axle $d'$, extends therefrom in both directions, terminating on one side in the bracket $o'$, that is, the bracket $p$ extended becomes a perfect equalizer, supporting the motors $c\ e$ equally, thus relieving the weight on the bars $k\ k'$ and distributing such weight as remains equally between said bars.

It will be observed that in the method of operation above described the motors partly support and balance each other. Furthermore, the motors are wholly supported by the axles, a great desideratum, since, by this arrangement, vibrations from the motors are not conveyed to the car body, and it is only necessary to make the car springs heavy enough to carry the car body with its load of passengers, without supporting any of the weight of the motors. Thus my invention makes my motor car a much easier riding vehicle than the ordinary motor car at present used.

Having thus described my invention, what I claim as new, and desire to secure by Letters Patent, is—

1. In a motor car or truck, the combination, substantially as described, with the axles of the car, of a motor having one end directly supported by one of said axles and the other end supported by an independent bar, said bar being, in turn, partly supported by the motor journal boxes and in part, directly or indirectly, by another axle of the car, independently of the truck frame and of the ordinary axle boxes.

2. In a motor car or truck, the combination, substantially as described, with the car axle, of a motor having one end journaled to said axle and the other end supported flexibly by an independent bar or device, said bar or device being partly supported by the motor journal boxes and partly, directly or indirectly, by another axle, independently of the truck frame and of the ordinary axle boxes.

WILLIAM ROBINSON.

Witnesses:
M. S. KAHURL,
HARRY B. WILLIAMS.